United States Patent
O'Neil et al.

(10) Patent No.: US 6,339,644 B1
(45) Date of Patent: Jan. 15, 2002

(54) METHOD AND APPARATUS FOR INTELLIGENT DATA NETWORK CALL SPAWNING SYSTEM

(75) Inventors: Joseph Thomas O'Neil, Staten Island, NY (US); Kenneth H. Rosen, Middletown, NJ (US); Steven Charles Salimando; Peter H. Stuntebeck, both of Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/205,332

(22) Filed: Dec. 4, 1998

(51) Int. Cl.$^7$ ................................................. H04M 9/00
(52) U.S. Cl. ...................... 379/900; 379/201; 370/352; 709/227
(58) Field of Search ............................... 379/90.01, 900, 379/201; 709/227, 209; 370/352

(56) References Cited

U.S. PATENT DOCUMENTS 5,838,682 A * 11/1998 Dekelbaum et al. . 379/90.01 X
5,884,032 A * 3/1999 Bateman ................. 379/216 X
5,991,394 A  11/1999 Dezonno et al. ........ 379/226 X

* cited by examiner

Primary Examiner—Creighton Smith

(57) ABSTRACT

An intelligent data network call spawning system monitors a subscriber's interactions on a data network and spawns a call to an information provider. The intelligent data network call set up system monitors the data network user's navigational actions and analyzes the actions with an expert system, for example. The system spawns a call to an information provider based on these actions. The intelligent data network call spawning system includes a call spawning device that serves as an interface between the subscriber and the information provider. The call spawning device supports web sites visited by subscribers and spawns calls to information providers and may coordinate with a call coordination device to provide preamble information to a called party so that the called party is briefed regarding the subject matter of interest to the subscriber.

24 Claims, 13 Drawing Sheets

METHOD AND APPARATUS FOR INTELLIGENT DATA NETWORK CALL SPAWNING SYSTEM

BACKGROUND OF THE INVENTION

1. Field of Invention

This invention relates to a method and apparatus for initiating a call to an information provider without a specific instruction by the user.

2. Description of Related Art

Conventionally, data network users such as Internet "surfers" may navigate through web sites to communicate or obtain information. Occasionally, a web site may offer more personal interaction through voice communication with a person via a telephone, for example. Business establishments may use such personal interactions to offer assistance regarding their products by providing operators that respond to calls from data network users. However, many times the "surfers" are unaware or too engrossed in other matters to use such features. Thus, new technology is needed assist the use of services such as described above.

SUMMARY OF THE INVENTION

The invention provides an intelligent data network call setup system that spawns a call to an information provider. The system comprises a call spawning device, at least one information provider, a user device, a network, and a call assistance device.

After logging on to a data network, such as the Internet, a subscriber may visit various web sites hosted by any number of information providers. As the user visits the various web sites, the call spawning device monitors actions of the subscriber and initiate (or spawn) a call to appropriate parties based on a navigational history of the subscriber. The call spawning device may spawn the call without explicit request by the subscriber based on its analysis of the navigational history. The analysis may be performed using expert systems, for example.

In addition, the call spawning system may include a call coordination device that generates preamble information. The preamble information is provided to the called party (e.g. an operation or another appropriate party) regarding the subject matter of interest to the subscriber so that the called party may be briefed and be enabled to provide help needed by the subscriber. Thus, the preamble information primes the called party.

In this way, the call spawning system enables the subscriber to take advantage of personal interaction features more effectively.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
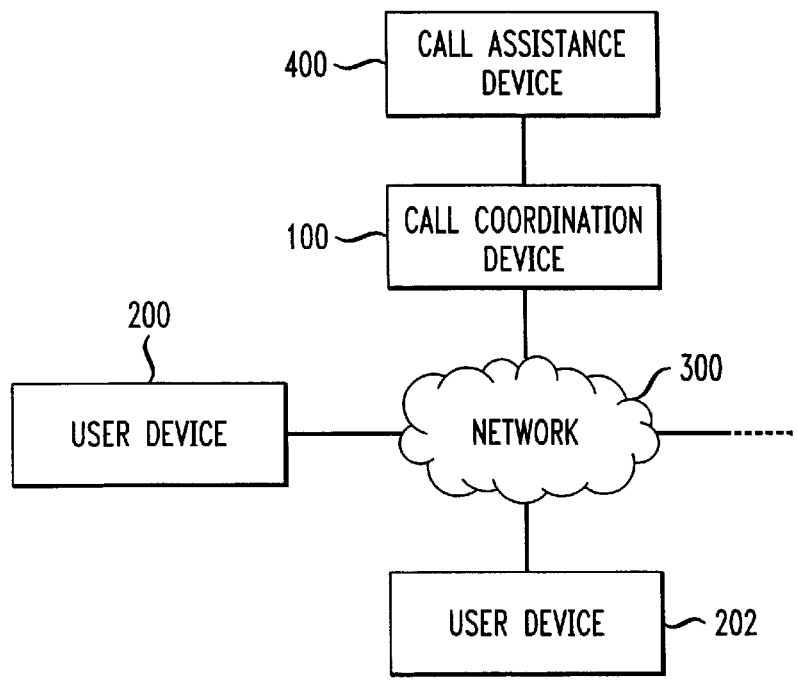
FIG. 1 shows a first exemplary embodiment of an intelligent data network call setup system.

FIG. 1 shows a block diagram of an intelligent data network call set up system 10 that includes user devices 200 and 202 coupled to a call coordination device 100 via the network 300. A call assistance device 400 may also be coupled to the call coordination device 100.

The network 300 may include a data network such as the Internet and/or a switched network such as a telephone network. The user devices 200 and 202 may be devices such as personal computers that are capable of logging onto a data network and may include voice communication devices such as telephone stations that interface with a telephone network, for example. The call coordination device 100 may support a web site on the network 300 so that user devices 200 and 202 may log on to the web site and navigate through the web site to obtain information, for example. The call assistance device 400 may also include devices such as personal computers and telephone stations that permit assistance personnel to interface through the network 300 with users using the user devices 200 and 202.

When a user using the user device 200, for example, logs on through the network 300 to a web site supported by the call coordination device 100, the user may navigate through the web site by making various selections. The web site may include features such as "click-to-dial" that permit the user to request voice communication with a web site representative such as an operator, for example. This feature offers personal interaction between the user and the operator to provide information to the user that may not be available at the web site, to answer any questions and/or to take any orders that the user may desire. Thus, when the user selects the click-to-dial option using a mouse, for example, the call coordination device 100 performs processes necessary to connect the user with the operator in a voice communication. Prior to such a connection, the call coordination device 100 provides the operator with preamble information regarding the user to "prime" the operator regarding the user so that effective user assistance may be provided.

Figure 2:
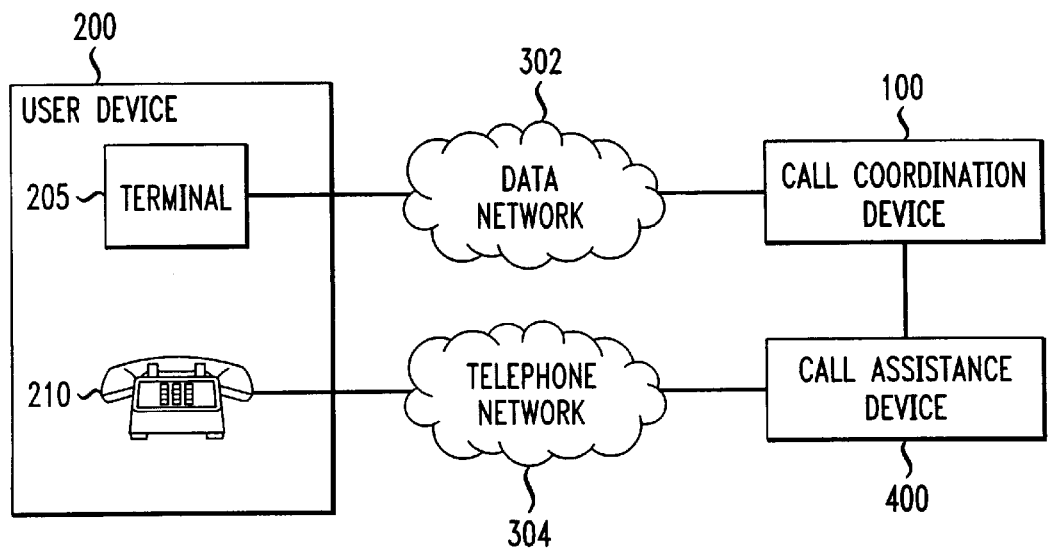
FIG. 2 shows a second exemplary embodiment of the intelligent data network call setup system.

FIG. 2 illustrates an embodiment where the user device 200 includes a terminal 205 such as a personal computer and a telephone station 210. The terminal 205 is coupled to the call coordination device 100 via a data network 302 and the telephone station 210 is coupled to the call assistance device 400 via a telephone network 304. While FIG. 2 shows the terminal 205 and the telephone station 210 as separate devices, these devices may be incorporated into one unit such as a telephone station card in a personal computer.

When the user invokes a click-to-dial icon using the terminal 205, the call coordination device 100 detects the user action and generates the preamble information to prime the operator of the call assistance device 400. This preamble information may be machine instructions if the operator is actually an automated unit such as a dialog system, for example. In this case, the preamble information may explicitly identify pre-prepared dialog scenarios of the dialog system that best match the needs, desires, etc. of the user as determined by the call coordination device 100 based on action histories, for example. If the operator is a human operator, then the preamble information may include formatted information regarding the user (e.g., name, age, ethnic background, etc., as available), action history, purchase history, available products, sales, etc.

The call coordination device 100 also may coordinate the communication between the user and the call assistance device 400. For example, if the operator is a dialog system, the call coordination device 100 may initiate a call to the user's telephone station 210 and bridge the dialog system with the user when the user answers the call. Prior to initiating the call to the user the call coordination device 100 may send a message to the user through the terminal 205 to acknowledge the reception of the click-to-dial selection and provide directions how to further proceed. For example, the call coordination device 100 may have a profile of the user that provides user information such as the number of telephone lines available at the user location and the telephone numbers that may be used to call the user.

If the user has two telephone lines that may be used, the call coordination device 100 determines which of the lines is being used for the data network connection and initiates the call via the other telephone line. If only one telephone line is available, the call coordination device 100 may send a message to the user via the terminal 205 to instruct the user to log-off the data network 302 so that the telephone line may be made available for the requested telephone call. When the telephone line is freed, then the call coordination device 100 initiates the call and bridges the call assistance device 400 with the user.

Instead of initiating the call, the call coordination device 100 may also provided a telephone number for the user to initiate the requested call. For example, the user may have only one line and may take some time to log-off from the data network 302. The user may also wish to remain logged on to the data network 302 and have an arrangement with a friend to interact with the operator. For example, the user may be navigating through the data network 302 on behalf of a friend who may not have a data network access device. Thus, the friend may initiate the call using a telephone line that is totally unrelated to the user.

In the above situation, the telephone call may be initiated after a long delay from when the click-to-dial icon was activated. The call coordination device 100 may prepare a save file associated with the telephone number provided to the user. The call coordination device 100 may provide a common telephone number to all the users such as an 800 number and also provide a special code to identify the specific click-to-dial action. In this case, the preamble information is associated with the special code and when the call is received, the preamble information associated with the special code is retrieved and used to prime the dialog system or the operator, for example.

Figure 3:
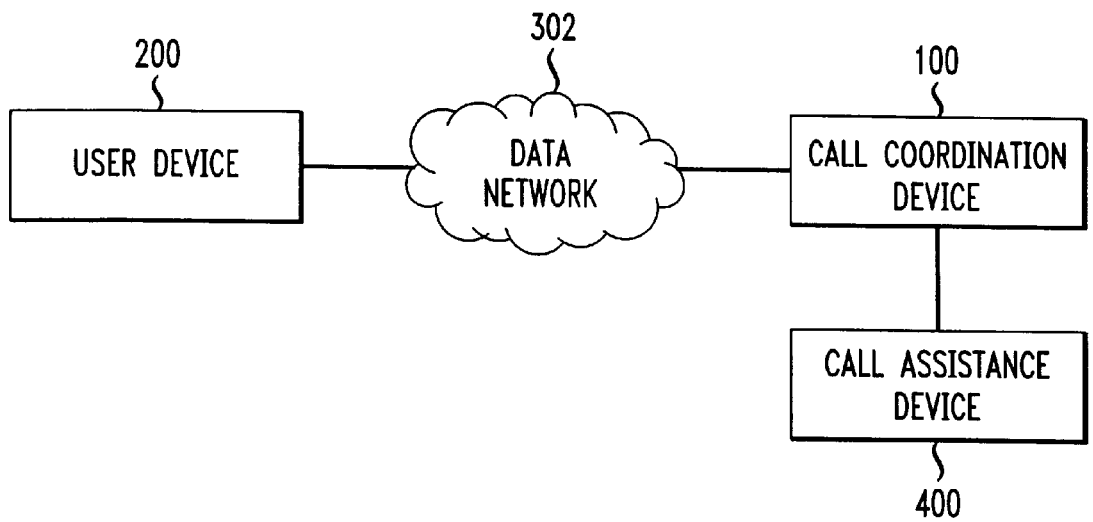
FIG. 3 shows a third exemplary embodiment of the intelligent data network call setup system.
Figure 4:
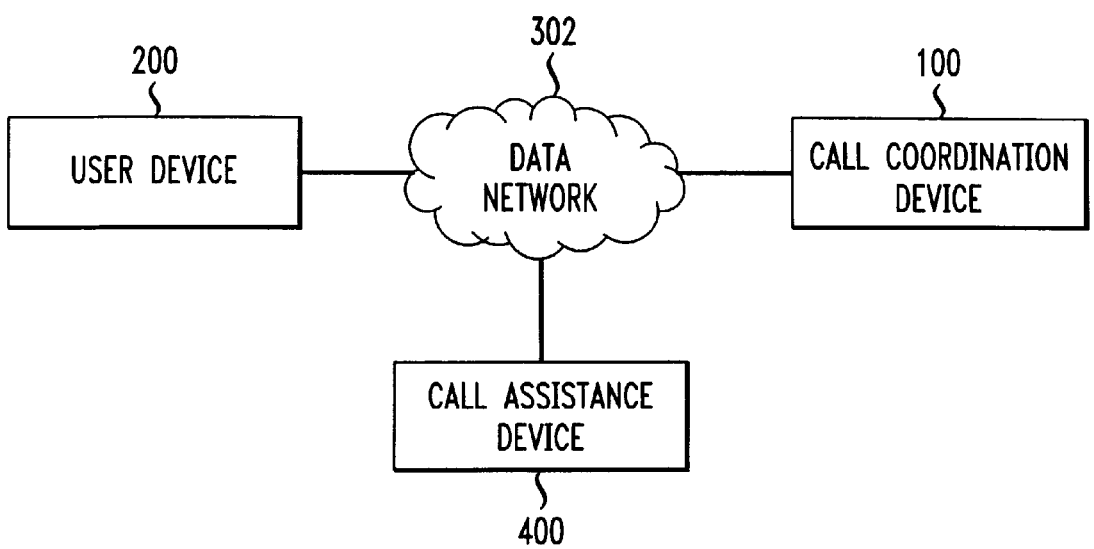
FIG. 4 shows a fourth exemplary embodiment of the intelligent data network call setup system.

FIGS. 3 and 4 show other possible couplings of the call assistance device 400. In FIG. 3, the call assistance device 400 interfaces with the user through the call coordination device 100 and data network telephony is used for voice communication with users. Instead of transmitting voice signals via a telephone network, voice data is passed between the call assistance device 400 and the user via the data network 302. Voice signals from the user and/or call assistance device 400 are packetized by known techniques such as digitizing voice prints, and transmitted via the data network 302. The packetized data may be converted to analog voice at the destination and output to the receiving party. In this way, only one line is required for data network log-on and voice communication. Thus, when using data network telephony, the call coordination device 100 does not need to initiate or bridge a call between the user and the call assistance device 400. Instead, the call coordination device 100 sends the preamble information together with instructions to the call assistance device 400 to communicate with the user directly via the data network 302.

FIG. 4 shows the call assistance device 400 interfacing with the data network 302 independent of the call coordination device 100. This embodiment allows the call assistance device 400 to be located at a place distant from the call coordination device 100, such as in a different city or state. Information such as the preamble information and/or telephony data may be communicated via the data network 302. If voice communications via the telephone network 304 is required, both the call coordination device 100 and the call assistance device 400 may have telephone network interfaces to connect and bridge calls to users.

Figure 5:
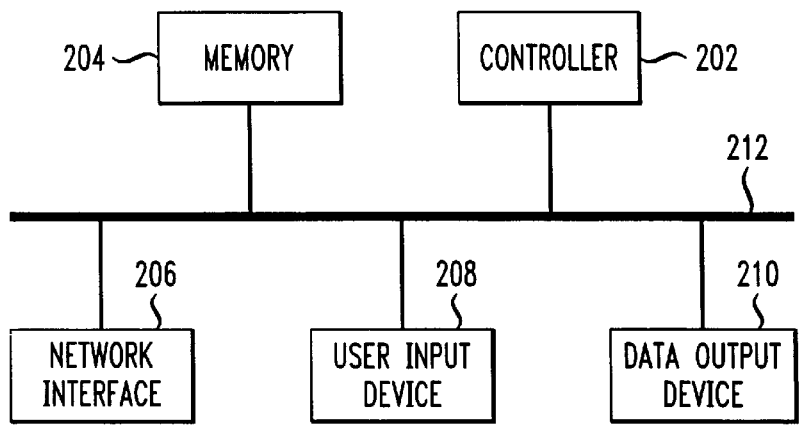
FIG. 5 shows an exemplary diagram of a user device.

FIG. 5 shows an exemplary block diagram of the user device 200. The user device 200 includes a controller 202, a memory 204, a network interface 206, a user input device 208 that may include a keyboard, a mouse and/or microphone, for example, and a data output device 210 that may include a display and speakers, for example. The above components are coupled together via signal bus 212. The user device 200 allows a user to log on to the data network and navigate through a web site by outputting graphics (i.e., video data) to the user via the data output device 210 (e.g., a display) together with any audio data and receiving inputs from the user via the user input device 208.

For example, the user device 200 may be a personal computer that is running a network browser, such as an Internet browser, for example. Other devices such as two-way television devices or voice communication devices that are enhanced with text-to-voice and voice-to-text systems that permit navigation of the data networks may also be used.

Figure 6:
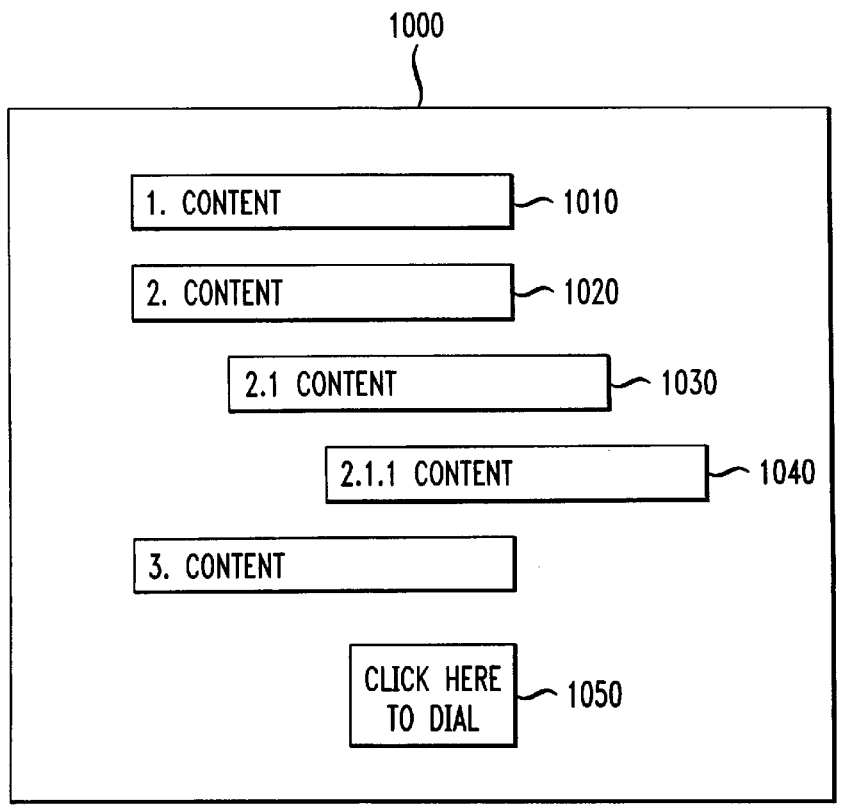
FIG. 6 shows an exemplary diagram of a web page.

FIG. 6 illustrates an exemplary display 1000 that may be displayed on the data output device 210 when the user is browsing a page of a web site. The display 1000 contains various items 1010–1040 and a click-to-dial icon 1050, for example. When the user selects the click-to-dial icon 1050, the call coordination device 100 responds by preparing preamble information based on the user's action and forwarding the preamble information to the call assistance device 400 along with a state of the user's log-on, for example. In this way, the operator's data network log-on may be placed in the same state as the user's data network log-on permitting the operator to view the same image as the user and to immediately engage the user in a relevant conversation.

Figure 7:
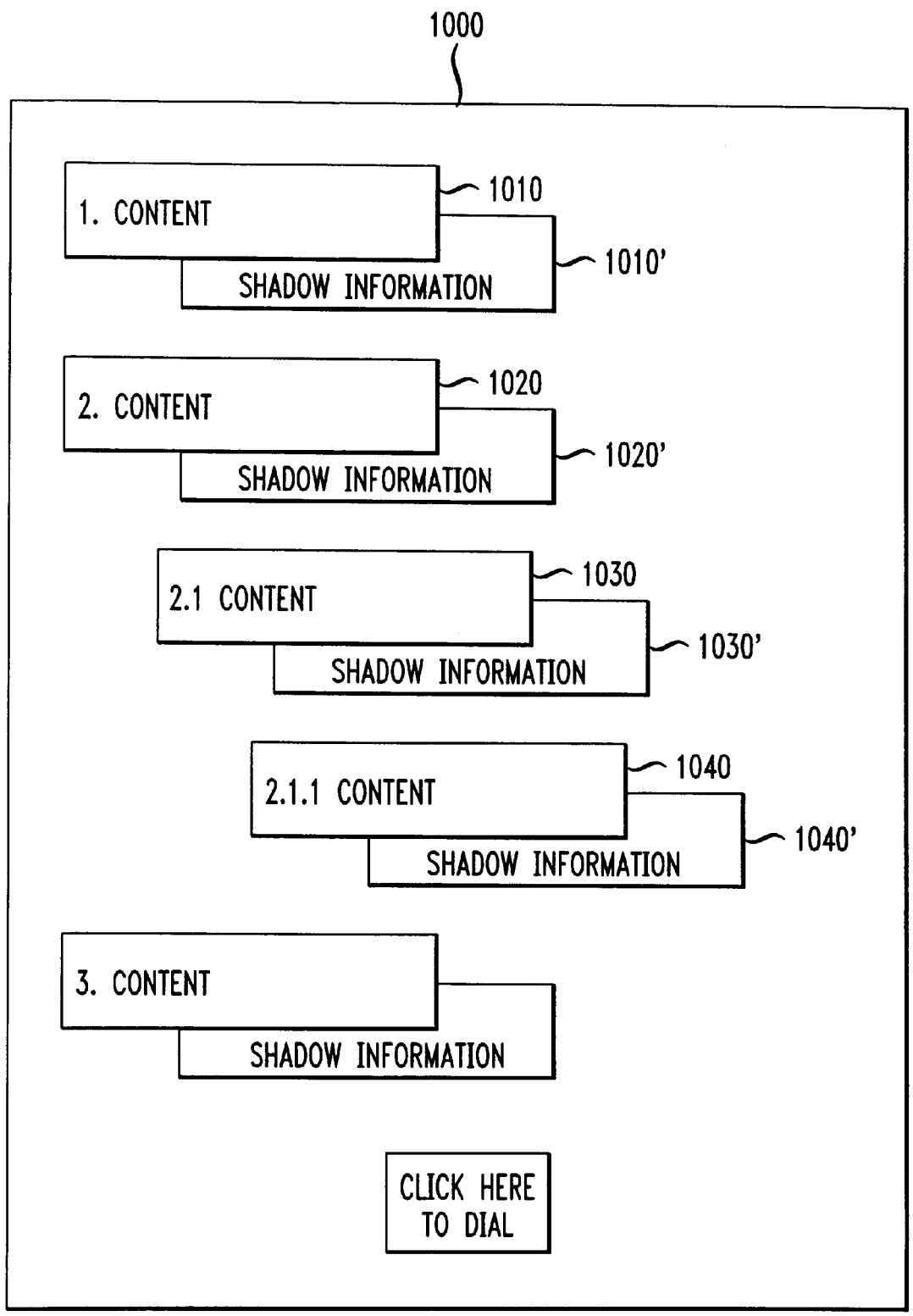
FIG. 7 shows a diagram of the web page in FIG. 6 showing shadow information.

FIG. 7 shows "shadow data" 1010'–1040' associated each of the items 1010–1040 of the display 1000. The shadow data 1010'–1040' may be located in a separate database that is only accessible by the call coordination device 100 or in some cases the shadow data 1010'–1040' may be selected for display by the user. In such cases, the user shall be allowed to change the shadow data to better reflect the user's reason for making the selection. The shadow data 1010'–1040' may be merely short summaries of the items 1010–1040 or may include additional information based on more sophisticated methods that enable the call coordination device 100 to generate appropriate preamble information to prime the operator.

For example, if the item 1010 reads as: "Join the club and get a free two day vacation at the Bahamas", the shadow data 1010' may be: "offer 125, expires Dec. 15, 1998, $50 minimum purchase." For a simple call coordination process, the preamble information sent to the call assistance device 400 may be identical to the shadow data.

If a more sophisticated call coordination process is used, the shadow data may include other additional information such as: "related offers 105, 44 and 205; $100 additional purchase adds first class flight plus $20 discount on dinner." The call coordination device 100 may generate the preamble information based on the combination of all the offers 125, 105, 44 and 205 and format a display of the call assistance device 400 to efficiently display the relevant preamble information.

As suggested above, the shadow data may include any information that assists in generation of the preamble information, for example, hyperlinks to other information sources such as video clips, audio files for particular advertising clips, etc., may be included. The call coordination device 100 may include advanced processes such as expert systems to process the shadow data to produce appropriate preamble information to prime the operator.

In addition, the call coordination device 100 may maintain current information (action history) relating to the user. For example, the call coordination device 100 may maintain the following information:

1) the last three selections made by the user. For example, suitcases: 1,2; bathing suits:2,5; discount brokerage:4, 30; the first number of each selection may represent the number of items visited within each selection and the second number may represent the time in minutes spent within each selection;
2) the user id;
3) the password used by the user;
4) the account number associated with the user; and
5) the prior month purchase amount of $200.

Based on the information above, the call coordination device 100 may incorporate recommendations tailored to the particular user such as specials on bathing suits and perhaps special offers on low interest loans to expand on the 2 day free vacation.

The shadow information may be attached to any item that may be selected by the user. Thus, after multiple consequential selections, a path of shadow data is generated that may be analyzed to produce possible motives, potential needs, etc.

Figure 8:
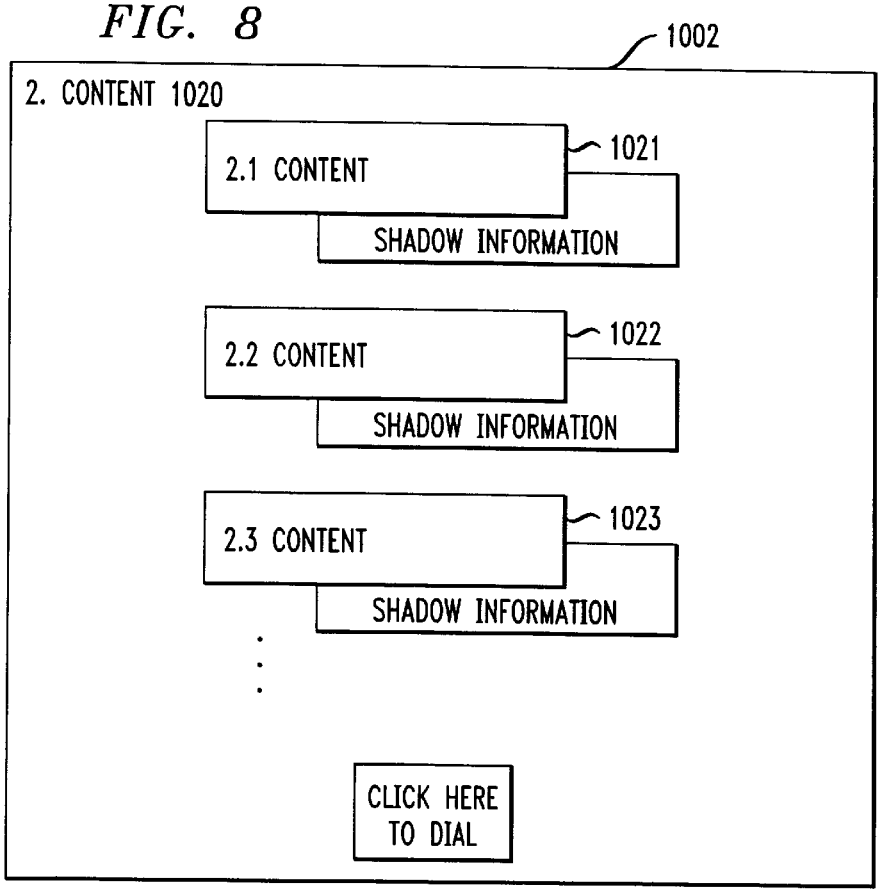
FIG. 8 shows an exemplary block diagram of a selected item of the web page shown in FIG. 7.

For example, if the user selects item 1020 of display 1000 shown in FIG. 7, a new display 1002 may result, as shown in FIG. 8. Each item in the display 1002 may also include shadow data. If the user selects item 1023, shadow data from both item 1020 and item 1023 may be used by the call coordination device 100 to generate the preamble information. If shadow data is not found, the call coordination device 100 may generate a summary of selected items "on the fly", for example, and use the summary as shadow data for the selected items.

Figure 9:
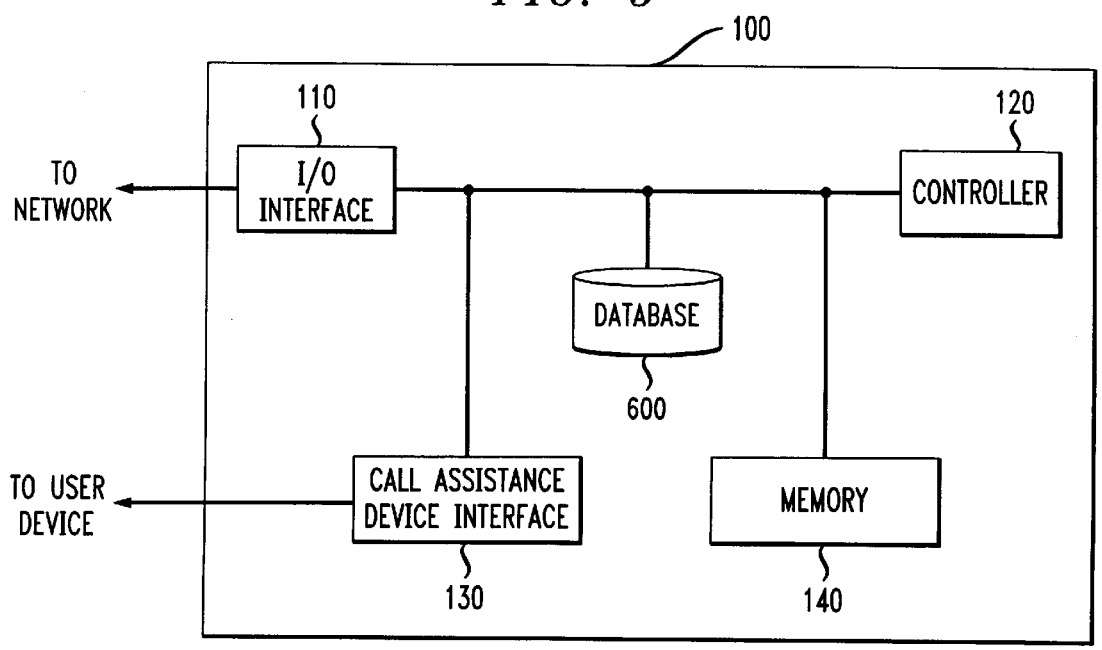
FIG. 9 shows an exemplary block diagram of the call coordination device.

FIG. 9 shows an exemplary block diagram of the call coordination device 100. Specifically, the call coordination device 100 may include an I/O interface 110, a controller 120, a call assistance device interface 130, a memory 140 and a database 600. The I/O interface 110 is connected to the network 300 which may include interfaces to both the data network 302 and/or the telephone network 304. The call assistance device interface 130 is coupled to the call assistance device 400 either directly or through the data network 302. If the interface with the call assistance device 400 is through the data network 302, then the call assistance device interface 130 may be combined with the I/O interface 110.

When the user logs on to a web site supported by the call coordination device 100, the controller 120 receives the log-on information such as user id, password (if applicable), user uniform resource locator (URL), etc., through the I/O interface 110. The controller 120 then generates appropriate video and audio information and outputs this information to the user through the I/O interface 110. When the user makes a selection, the controller 120 responds by outputting appropriate information and processing the shadow data corresponding to the items selected by the user. For example, the controller 120 may simply save the shadow data in the database 600 so that a history of selections may be provided for later preamble information generation.

The controller 120 may also initialize the database 600 for the particular user by searching for and retrieving any profile information that was generated for the user based on prior interactions with the user. For example, the controller 120 may keep history data on past users that have logged on to the web site. Thus, when a user logs on to the web site, the controller 120 may retrieve such historical information and initialize a user action history file in the database 600. The action history file is updated by the actions taken by the user during a log-on of the web site. If the user selects a click-to-dial icon, the controller 120 processes the contents of the action history file to generate preamble information used to prime the operator. As discussed earlier, the action history file may be processed by any number of techniques including using expert systems.

When the preamble information is generated, the controller 120 may organize the preamble information in an appropriate format. For example, the controller 120 may create a summary display similar to a table of contents using predetermined standardized headings such as user name, user interest, user purchasing range, etc. In this way, the call assistance device 400 may receive the preamble information in such form that allows efficient interaction with the user. For example, an operator may be provided personal information regarding the user immediately by simply scanning the summary display and be able to greet the user personally by name, for example. Then, as the interaction progresses, the operator may immediately access information depending on the progress of the conversation by simply scanning the summary and retrieving by hyperlink, for example, only the information that is relevant based on the substance of the conversation.

In addition to sending the preamble information to the call assistance device 400 through the call assistance device interface 130, the controller 120 may also retrieve a user profile from the database 600 to determine how to connect the call assistance device 400 with the user in a voice communication connection. For example, as discussed earlier, if the user profile indicates that the user has two telephone lines and that one of the telephone lines is used for the data network connection while the other telephone line is used for voice communication, the controller 120 may initiate a telephone call to the user using the designated line.

If, for example, the user profile indicates that the user has data network telephony capability, the controller 120 may instruct the call assistance device 400 to communicate directly with the user through the data network via voice telephony. If the controller 120 determines that the user has only a single telephone line and that telephone line must be used for either the data network communication or voice communication via the telephone network 304, for example, the controller 120 may send a message to a user via the I/O interface 110 and the data network 302 for the user to log-off from the data network and to wait for a telephone call to voice communicate with the call assistance device 400.

Figure 10:
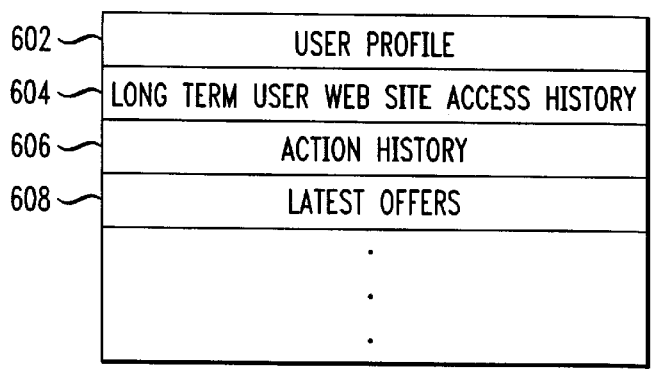
FIG. 10 shows an exemplary diagram of a call coordination device database.

FIG. 10 shows an exemplary block diagram of the database 600. The database 600 may include user profiles 602, long term user web site access histories 604, action histories 606, and latest offers 608. Each of the user profiles 602 may include personal information of a user such as user log-on ID a number of telephone lines available to the user, user preferences, account number, sex, age, etc., for example. Each of the long term user web site access histories 604 may include information such as the type of items selected by a user over a predetermined period of time such as the prior three months, for example. Also, information such as number of purchases made and total dollar amount of business obtained from a user over the last twelve months.

Each of the action histories 606 may include the item selections of a current log-on session of a user with the web site. As discussed earlier, the action histories 606 may include shadow data of all the selections in logical and/or chronological order. The latest offers 608 include items that are on sale or are attractive "deals" that have particular interest to users. The latest offers 608 may be generated during background processes by the controller 120 based on analysis of the other fields 602, 604 and 606 as well as current conditions regarding items that are on sale, special offers or items that are determined to be of particular interest to users at a particular time. The controller 120 may perform other background processing to perform analysis of the data for better response to the user and to collect business forecast information, for example. The database 600 includes all information that may be useful for generating preamble information to prime the operator for interactive communication with the user.

Figure 11:
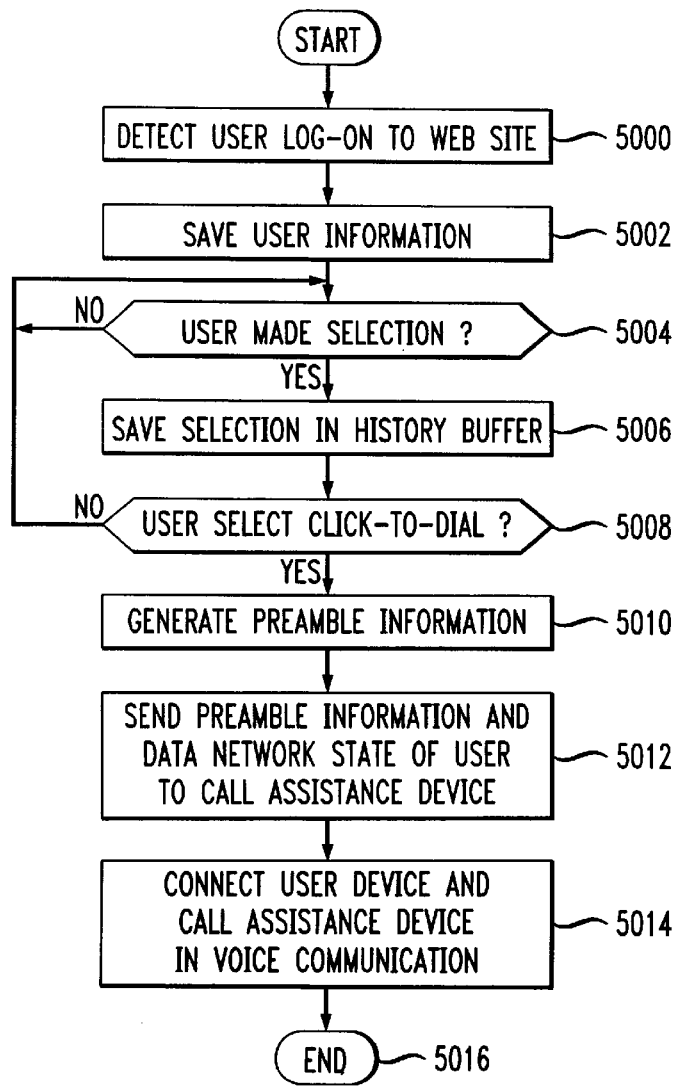
FIG. 11 is a flowchart illustrating an exemplary process of the call coordination device.

FIG. 11 shows an exemplary process of the data network call setup system 10 after a user logs onto the web site supported by the data network call setup system 10. In step 5000, the controller 120 detects that a user logged on to the web site and goes to step 5002. In step 5002, the controller 120 updates the user profile 602 in the database 600 with the user information and goes to step 5004. In step 5004, the controller 120 monitors the user's interactions with the web site and detects if the user has made a selection. If the user made a selection using a mouse, for example, the controller 120 goes to step 5006; otherwise the controller 120 returns to step 5004.

In step 5006, the controller 120 saves the selection in the action history 606 and goes to step 5008. In step 5008, the controller 120 determines whether the user selected a "click-to-dial" icon. If the user selected the click-to-dial icon, the controller 120 goes to step 5010; otherwise, the controller 120 returns to step 5004.

In step 5010, the controller 120 generates preamble information based on the contents of the database 600 and goes to step 5012. In step 5012, the controller 120 forwards the preamble information and the data network state of the user to the call assistance device 400 and goes to step 5014. In step 5014, the controller 120 connects the call assistance device 400 to the user device 200 in a voice communication and assists in setting up the operator's data network log-on to the same state as the user's data network log-on, for example, and goes to step 5016 and ends the process.

Figure 12:
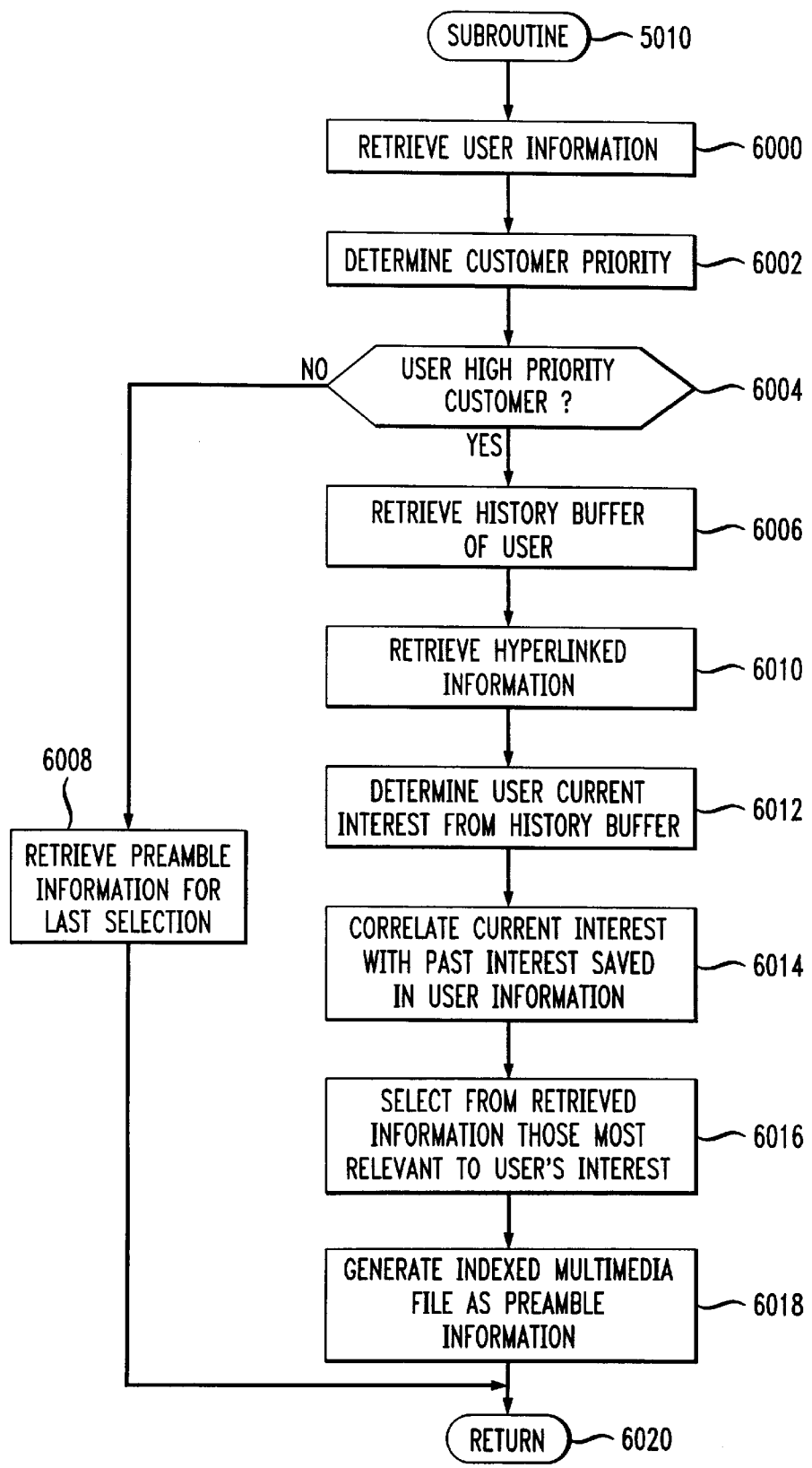
FIG. 12 is a flowchart illustrating a preamble information generation process.

FIG. 12 shows in greater detail an exemplary process for generating the preamble information in step 5010 of FIG. 11. In step 6000, the controller 120 retrieves user information such as the user profile 602 and the long term user web site access history 604, for example, and goes to step 6002. In step 6002, the controller 120 may determine a customer priority based on the number and dollar amount of purchase made by the user, for example, and goes to step 6004. In step 6004, the controller 120 determines whether the user is a high priority customer based on predetermined criterion. The predetermined criterion may be at least 10 purchases or more in the last three months, for example. If the user is a high priority customer, the controller 120 goes to step 6006; otherwise, the controller 120 goes to step 6008. In step 6008, the controller 120 retrieves the preamble information for the last selection as the preamble information and goes to step 6020 to return to step 5012 of the calling process.

In step 6006, the controller 120 retrieves a history of the user such as the action history 606 and the long term user web site access history 604 and goes to step 6010. In step 6010, the controller 120 retrieves additional information such as the latest offers 608 or other information via hyperlink, for example, and goes to step 6012. The latest offer 608 may contain hyperlinks to other databases that may be a general repository of all the offers, etc., of a business. In step 6012, the controller 120 determines the current interest of the user based on the data in the history and goes to step 6014. In step 6014, the controller 120 correlates the current interest with past interest that may be in the user information and goes to step 6016.

In step 6016, the controller 120 selects, from the retrieved information, the information most relevant to a user's interests and goes to step 6018. For example, based on the current interest, the controller 120 selects from the latest offers 608, those offers that best correlate with the current interest determined in step 6014. In step 6018, the controller 120 generates an indexed multimedia file as preamble information to be forwarded to the call assistance device 400 and goes to step 6020 and returns to step 5012 of FIG. 11.

In the above described process, the user initiates a request for a call by selecting the click-to-dial icon. However, situations occur where the user is unaware that additional information or help may be available through the call assistance device 400 because either the click-to-dial icon is not readily identifiable or not provided by the web site visited by the user. Moreover, the user may have visited many different web sites supported by parties that are not associated with each other so that a complete understanding of the user's circumstances is not observable from the view point of any one of the web sites. Thus, the invention provides a data network call spawning system that assists the user independent of particular web sites that the user may be visiting.

Figure 13:
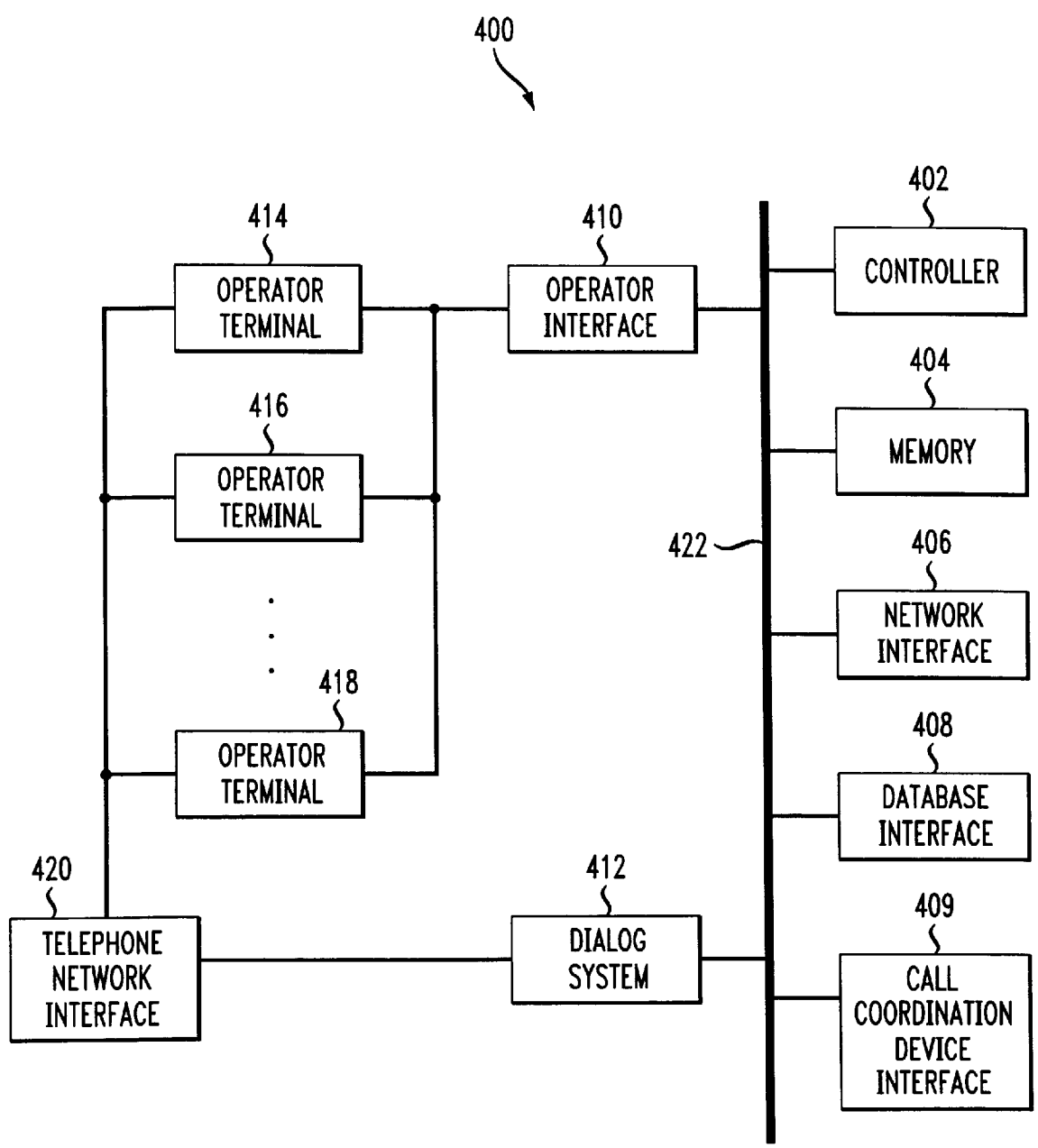
FIG. 13 shows an exemplary diagram of a call assistance device.

FIG. 13 shows a block diagram of the call assistance device 400. The call assistance device 400 includes a controller 402, a memory 404, a network interface 406 and a database interface 408. The above components are coupled by a single bus 422.

Also coupled to the data bus 422 are an operator interface 410 that interfaces with operator terminals 414–418, and optionally a dialog system 412. Both the operator terminals 414–418 and the dialog system 412 may be also coupled to a telephone network interface 420.

While FIG. 13 shows a bus architecture, other architectures are possible as are well known in the art. In addition, the operator terminals 414–418 and the dialog system 412 may have individual connections to the telephone network without going through a telephone network interface 420. The telephone network interface 420 may be a private branch exchange (PBX), for example. Also, the network interface 406 may include both interfaces for the data network 302 and the telephone network 304.

When the call coordination device 100 sends preamble information to the call assistance device 400, the controller 402 receives the preamble information through the call coordination device interface 409. The preamble information may be identified with a header, for example, that indicates a user ID so that the controller 402 may correlate the receipt preamble information with a particular user that requested a call. In addition, the call coordination device 100 may indicate whether the user has telephony capability over the data network 302 or requires a telephone network connection. If a telephone network connection is required, the call coordination device 100 may initiate a call to the user and initiate a second call to the call assistance device 400 to the telephone network interface 420, for example, and then bridge the two calls. Alternatively, the call coordination device 100 may provide all the needed information to the call assistance device 400 to complete the voice communication process.

For example, the controller 402 may receive the preamble information together with additional instructions required to initiate a call through the telephone network interface 420 to the user or to have sufficient identification between the preamble information and a special code, for example, so that when a call is received from the user through the telephone network interface 420, the preamble information may be provided to the correct one of the operator terminals 414-418 to assist the user. As discussed earlier, the call coordination device 100 may elect to answer the user request to answer the dialog system 412. In such a case, the preamble information may be commands to the dialog system 412 and data to specify a particular predetermined dialog scheme to accomplish the voice communication with the user. Determination whether to use an operator or the dialog system 412 may be determined by the controller 402. In such a case, the call coordination device 100 sends instructions to the controller 402 and the controller 402 may make the decision whether to connect the user to one of the operators or to the dialog system 412.

If the dialog system 412 is selected, the controller 402 may retrieve different dialog schemes from a database through the database interface 408 and provide them to the dialog system 412. If the controller 402 is instructed by the call coordination device 100 to call the user, the controller 402 may instruct the dialog system 412 to initiate a call through the telephone network interface 420 to complete the voice communication. Otherwise, if the user was instructed to call the call assistance device 400, the dialog system 412 may be prepared to answer the call if the dialog system 412 is the destination for the number provided to the user.

If either the call coordination device 100 or the controller 402 decided to communicate with the user via operators, the controller 402 selects one of the operator terminals 414–418 based on well known operator assignment schemes and provides the instruction to the operator interface 410 together with the preamble information so that the selected operator terminal 414–418 may be "primed" with the appropriate preamble information and the operator terminals may be logged on to the data network through the network interface 420, for example, and be initialized into the same state on the data network as the state of the user terminal 200, for example.

After the voice communication with the user is completed, the controller 402 collects the results of the voice communication from either the operator terminals 414–418 or the dialog system 412 and takes any subsequent action that may be required. For example, if the user purchased items that were offered, the controller 402 may send the purchase information to other appropriate units through the network interface 406, for example, to complete the order. The controller 402 may also process the results of the voice communication and send those results to the call coordination device through the call coordination device interface 409 so that the database 600 may be properly updated to prepare for future voice communication with the user.

Figure 14:
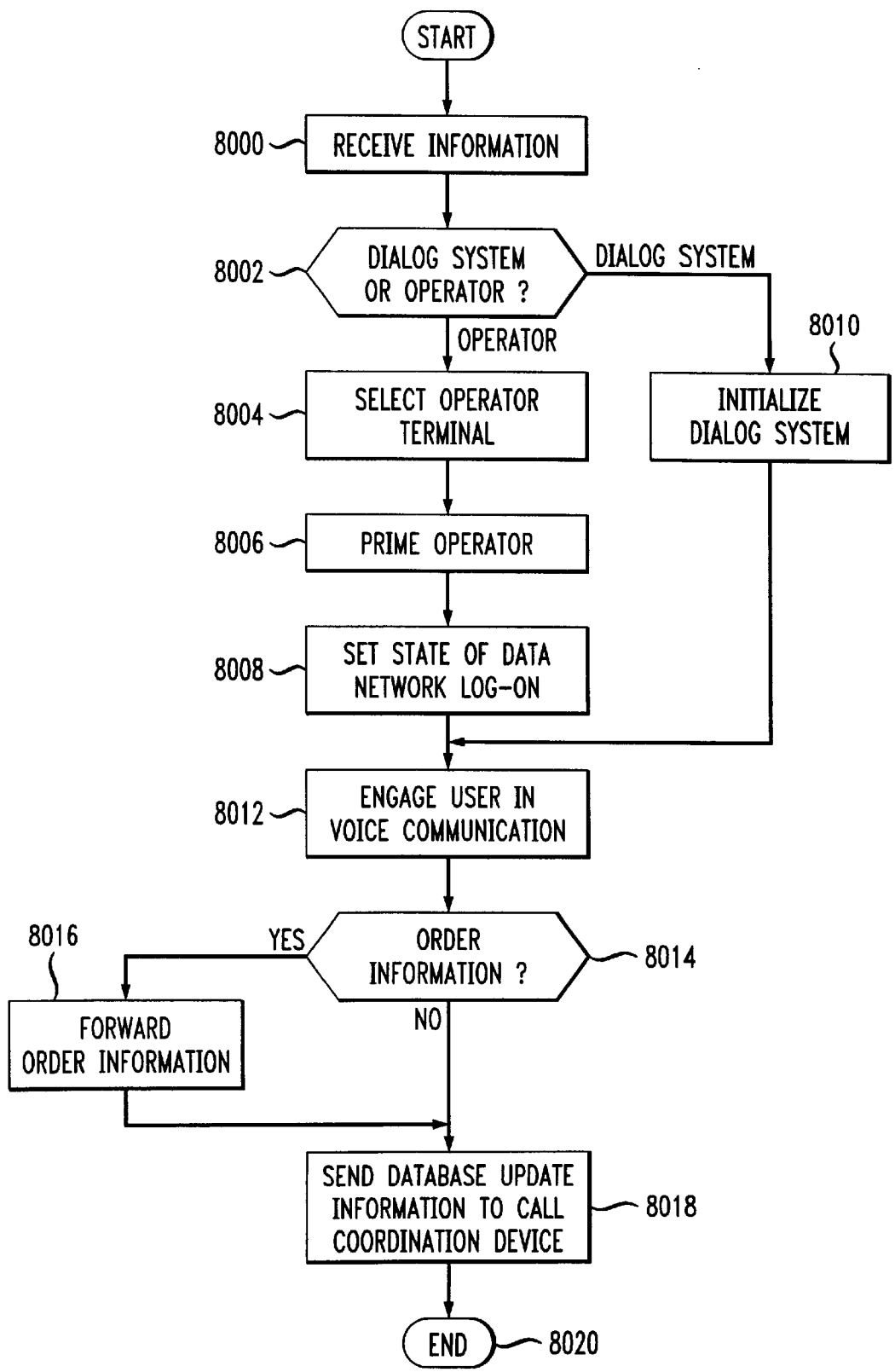
FIG. 14 is a flowchart illustrating a process of the call assistance device.

FIG. 14 shows a flowchart for a call assistance device process. In step 8000, the controller 402 receives pre-information and other instructions from the call coordination device through the call coordination device interface 409 and goes to step 8002. In step 8002, the controller 402 determines whether voice communication with the user should be engaged with one of the operator terminals 414–418 or with the dialog system 412. If one of the operator terminals 414–418 is selected, the controller 402 goes to step 8004; otherwise the controller goes to step 8010.

In step 8004, the controller 402 selects one of the operator terminals 414–418 and goes to step 8006. In step 8006, the controller 402 primes the selected operator terminal and goes to step 8008. In step 8008, the controller 402 sets a state of a data network logon of the selected operator terminal to the user data network logon state and goes to step 8012. In step 8010, the controller 402 initializes the dialog system 412 and goes to step 8012.

In step 8012 the controller 402 initiates voice communication with the user by either sending instructions to the operator terminal 414–418 or the dialog system 412 and makes the necessary arrangements for either a telephone network communication or a data network telephony communication. After the voice communication with the user is completed in step 8012, the controller 402 goes to step 8014. In step 8014, the controller 402 determines whether the user had ordered any information such as making purchases or requesting materials. If such order information was obtained, the controller 402 goes to step 8016, otherwise, the controller goes to step 8018. In step 8016, the controller 402 forwards the order information to the appropriate devices and goes to step 8018. In step 8018, the controller 402 sends update information for the database 600 to the call coordination device and goes to step 8020 and ends the process.

Figure 15:
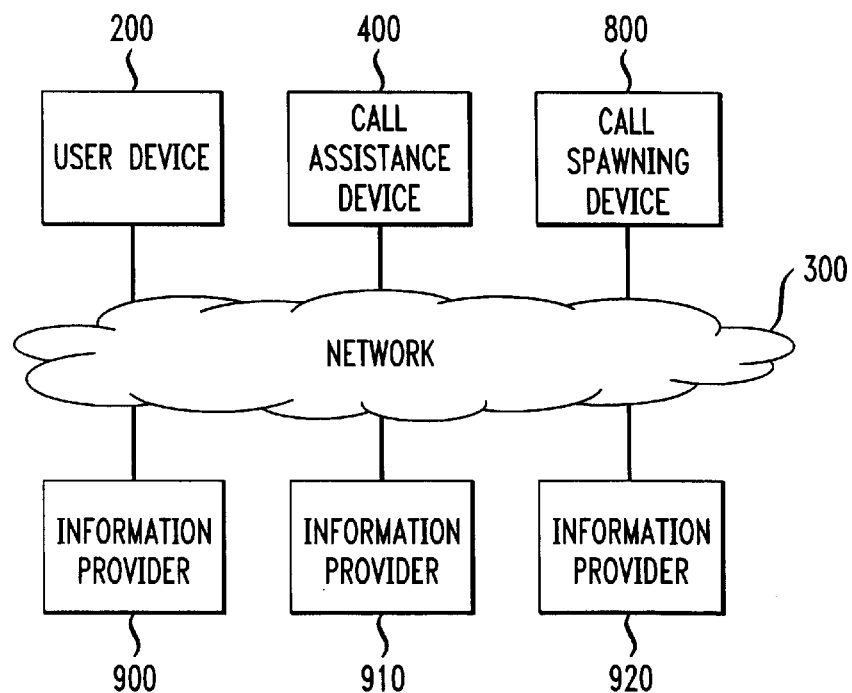
FIG. 15 shows a block diagram of a call spawning system.

FIG. 15 illustrates an exemplary diagram of an intelligent data network call setup system 20 that also provides call spawning. The system 20 comprises a call spawning device 800, and at least one information provider such as information providers 900, 910 and 920, the user device 200, the network 300, and the call assistance device 400.

As before, the network 300 may include the data network 302 and the telephone network 304. The user device 200 may include a terminal 205 and a telephone station 210 as shown in FIG. 2. While FIG. 15 shows the call assistance device 400 coupled to the network 300, other configurations are possible such as shown in FIGS. 2–4 with the call coordination device 100 replaced by the call spawning device 800. Also the call spawning device 800 and the call coordination device 400 may be incorporated together into one device or be embodied as separable devices but both connected to the call assistance device 400 based on implementation details. For the ease of discussion, the call coordination device 100 and call spawning device 800 are assumed to be separate and independent. Thus, to perform both call coordination and call spawning, the call assistant device 400 is coupled to both the call coordination device 100 and the call spawning device 800.

After logging on to a data network, such as the Internet, a subscriber to the call spawning system 20 may visit web sites hosted by any number of information providers 900–920. The call spawning device 800 monitors actions of the user device 200 and generates a navigational history for the subscriber. The call spawning device 800 processes this navigational history by using an expert system, for example. Depending on the results of this analysis, the call spawning device 800 may spawn (or initiate) a call automatically without explicit request by the subscriber to either the call assistance device 400 or another appropriate assistance party, as discussed below. The call spawning device 800 may also function in conjunction with the call coordination device 100 so that the preamble information may be provided to prime the call assistance device 400 or the appropriate assistance party.

For example, when the subscriber browses a home improvement web site, selects a plumbing section, and then selects a "how to" guide for repairing a particular plumbing fixture, the call spawning device 800 analyzes the selected subject matter via associated shadow data, for example, and determines that the subscriber is interested in repairing or purchasing a particular type of plumbing fixture. The call spawning device 800 may locate a participating supplier in a telephone call (i.e., spawn a call) and if available, bridge the supplier with another call to the subscriber. The supplier may be primed with appropriate preamble information received from the call coordination device 100.

The call spawning device 800 is independent of the information providers 900–920 and thus may track the subscriber's data network "surfing" across independent web sites. For example, the subscriber may first log on to a web site supported by the information provider 900 and make several selections relating to bathroom fixtures. Then, the subscriber may log on to a web site supported by the information provider 910 and select plumbing tools and related supplies. Finally, the subscriber may log on to the information provider 920 and select items related to home improvement information, how to books, etc. Based on the above action history, the call spawning device 800 may immediately spawn a connection between a local plumber and the subscriber.

Instead of immediately spawning a call, the call spawning device 800 may first review a history of the subscriber to better determine the subscriber's need before spawning a call. For example, the call spawning device 800 may retrieve the subscriber's profile to determine an income level. If the subscriber's income is in a low income bracket, then a call to a local hardware store may be more appropriate than a call to a high priced plumbing service corporation. On the other hand, if the subscriber is in the high income bracket, then a call to the plumbing service corporation may be more appropriate. Thus, the call spawning device 800 may provide assistance based on a "global" view of the subscriber's data network activities and information regarding the subscriber.

The call spawning device 800 may interact with the subscriber before spawning calls. For example, after detecting that the subscriber has visited five web sites making selections relating to plumbing fixtures, the call spawning device 800 may open a window on a user device display and query the subscriber whether help is needed or provide a bit of advice that may be available. The call spawning device 800 may output a message such as "want to talk to Joe plumber who is available now to help you with plumbing fixtures?". If the subscriber indicates "no" either by explicit command or simply ignoring the message, then the call spawning device 800 may save this fact and change call spawning parameters for the subscriber to refrain from offering additional advice unless other overriding reasons arise.

The call spawning device 800 may also offer advice/assistance to the subscriber for other circumstances than those described above. For example, if the subscriber searches for a specific article using one of the available search engines, and the author of the article is available for conversation, the call spawning device 800 may spawn a connection between the subscriber and the author for a real time "live" discussion. If the call spawning device 800 detects that the subscriber is having difficulty in using the browser, for example, the call spawning device 800 may either offer immediate assistance via a message or spawn a call between the subscriber and a call assistant familiar with the browser to help resolve the difficulty. Thus, the call spawning device 800 may serve as a help enabler for any subject matter for which there is an available expert.

Figure 16:
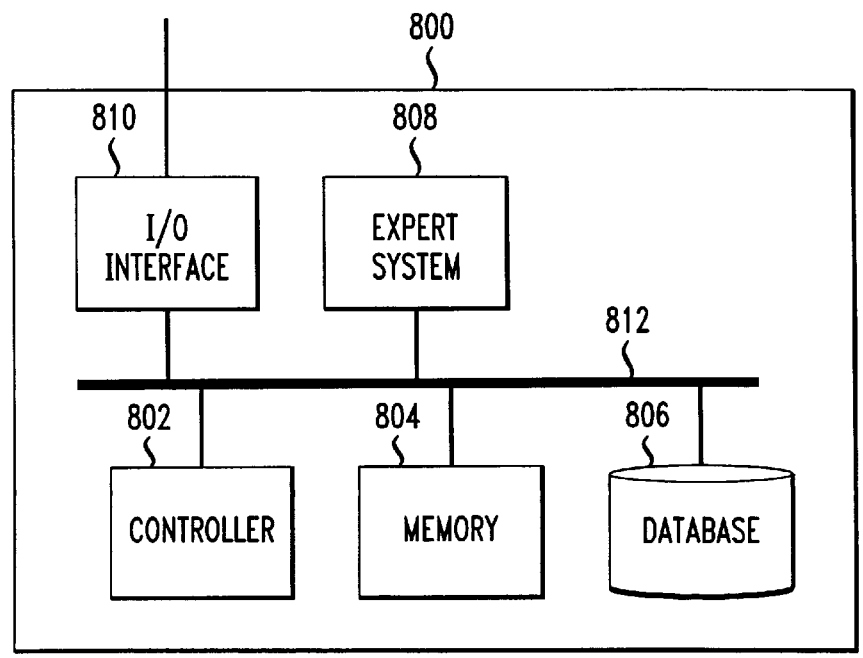
FIG. 16 shows an exemplary diagram of a call spawning device.

FIG. 16 shows a block diagram of the call spawning device 800. The call spawning device 800 may include a controller 802, a memory 804, a database 806, an expert system 808, and an I/O interface 810 that interfaces with the network 300. The above components are coupled together via signal bus 812. The controller 802 may also perform all the functions of the expert system 808 in which case the expert system 808 is not needed.

When the subscriber logs on to the data network 302, the user device 200 may send a message to the call spawning device 800 to indicate that call spawning support processes should be started for the subscriber. The controller 802 may retrieve from the database 806 the subscriber profile and history information similar to the information stored in the database 600 as shown in FIG. 10. However, the information stored in the database 806 is not restricted to a single web site. The controller 802 opens an action history file for the subscriber and tracks the subscriber's actions on the data network 302 by storing shadow data of each selected item.

While the controller 802 is maintaining the action history file, the expert system 808 analyzes the information in the action history file to determine whether call spawning is appropriate or whether a query should be sent to the subscriber, for example. The expert system 808 may contain rules that essentially reduce the action history to interest, motivation, need, etc. of the subscriber.

Additionally, the call spawning device 800 may prompt the subscriber whether or not to initiate a call after it has been determined that the call spawning criteria have been met. For example, the call spawning device could open a window on the display device of the subscriber. The window could, for example, prompt the subscriber whether the determined call should be initiated. If the subscriber affirms that a call should be initiated, then the call spawning device 800 could initiate the call. Alternatively, if the subscriber responds in the negative, or ,for example, fails to answer within a predetermined time, the call is not initiated.

For example, if the shadow data are encoded with keywords that distill the essence of each selection, then combinations of keywords may indicate interest, motivation, and etc. If the subscriber logs on to a home improvement web site having initial keywords of: new, high price and ornamental; and selects light fixtures having keywords of high skill and special equipment; and then selects chandeliers, having keywords of fragile, heavy, 10' ceiling minimum, the expert system 808 may recommend a local electrical contractor that specializes in complex fixture installments as a first choice and a do-it-yourself hardware store as a second choice. The controller 802 may select one of these recommendations by retrieving the subscriber's data network purchase and account history to discriminate between a wealthy subscriber purchasing a chandelier for a mansion versus a middle class subscriber building a dream house on a shoestring budget, for example. If the latter, the controller 802 may select the do-it-yourself hardware store second choice recommended by the expert system 808, for example.

Alternatively, for example, the expert system 808 could group a list of potential called parties indexed to a list of keywords. For example, the expert system 808 could evaluate the action history file to generate a list of relevant keywords based on a predefined criteria. The relevant keywords could then be compared with the indices of the list to generate a list of potential parties to initiate calls to.

Figure 17:
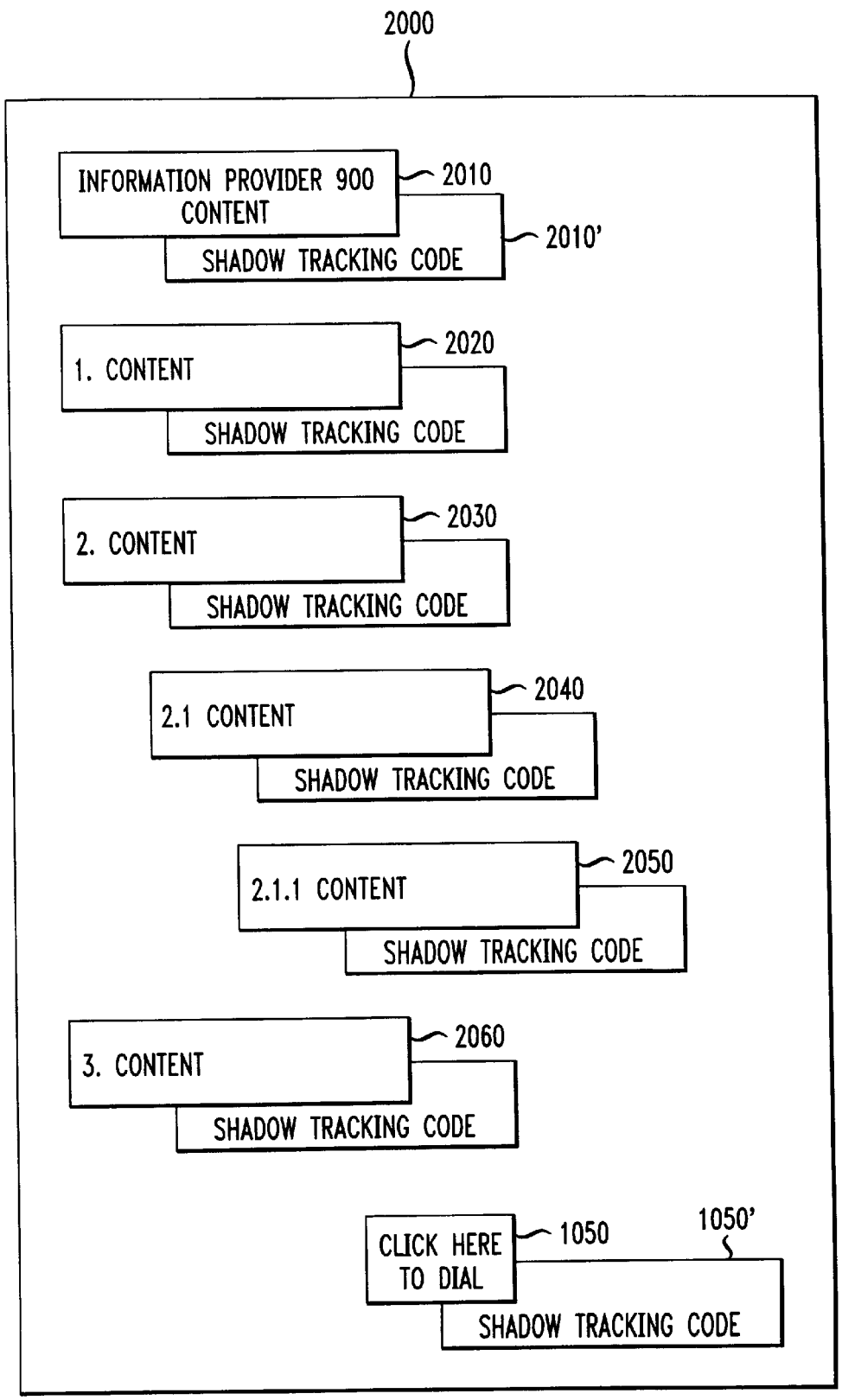
FIG. 17 shows an exemplary diagram of a web page of a first information provider.
Figure 18:
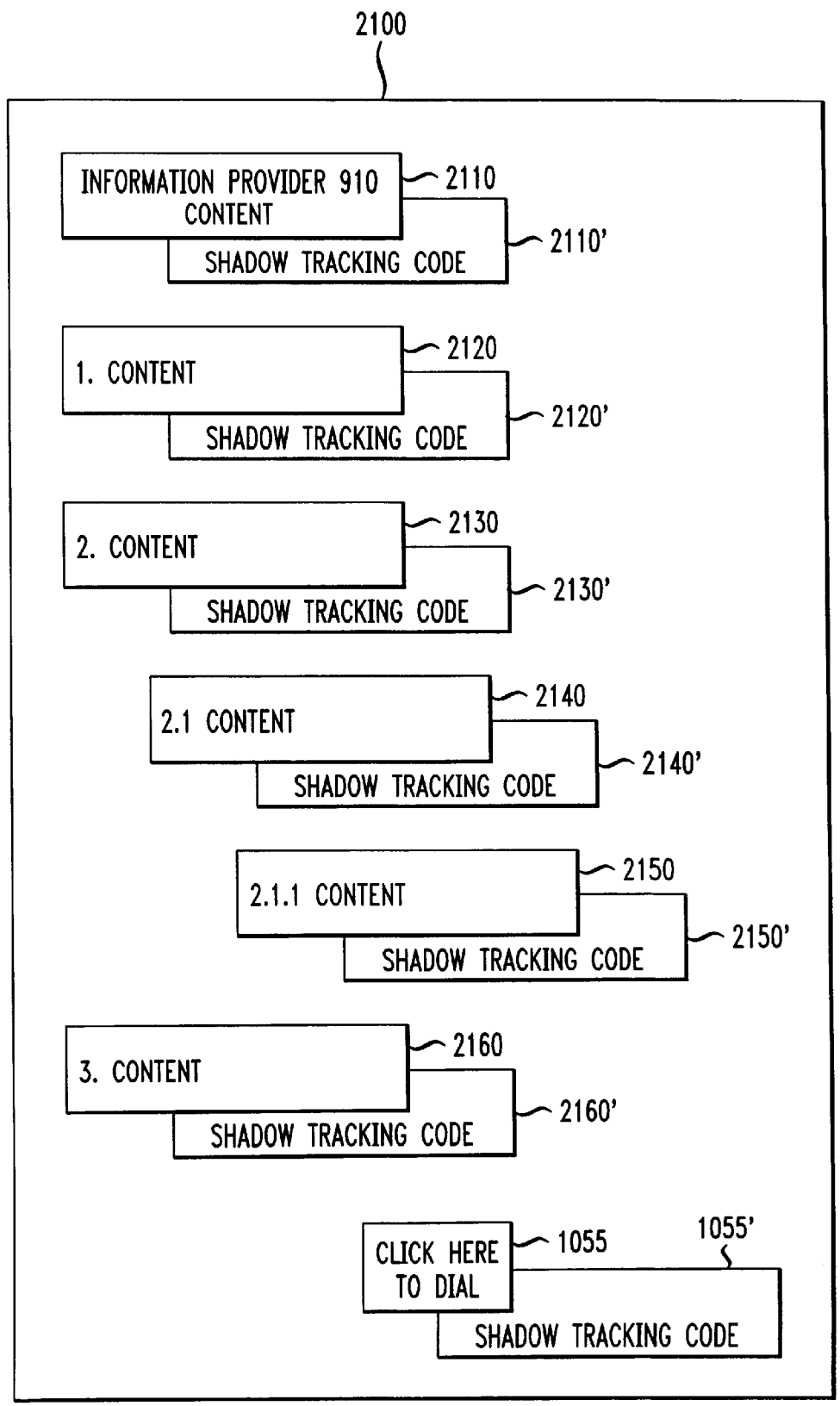
FIG. 18 shows an exemplary diagram of a web page of a second information provider.

FIGS. 17 and 18 illustrate an exemplary display 2000 and 2100 of web pages for two information providers 900 and 910, respectively, enhanced with shadow tracking codes. While the tracking codes are shown to be on the displays 2000 and 2100, they most likely are not actually displayed but are associated with each respective selection via hidden information such as a hyperlink accessible to the controller 802. For example, FIGS. 17 and 18 illustrate web pages having selections 2010–2060 and corresponding shadow tracking codes 2010'–2060' and selections 2110–2160 with tracking codes 2110'–2160'. The tracking codes may include preamble information, which may include for example, a brief description of the subject matter of the selection, as well as the identification of the information providers 900 and 910 and web page identification such as the URL of the web page. The tracking code could further include, for example, the identification of a potential call destination. As the subscriber navigates throughout the data network 302, the tracking codes corresponding to each of the selections are stored in the database 806 to create the action history for the current data network log on of the subscriber. As shown in the FIGS. 17 and 18, even the click-to-dial icons 1050 and 1055 may have shadow tracking codes 1050' and 1055' so that the controller 802 may record subscriber requested calling events.

The tracking codes may be created by hypertext markup languages when creating a web page, for example. Keywords may be inserted at the time of web page generation based on standardized meanings. For example, a standard list of keywords and their meanings may be established so that web page builders may connote correct meanings of selection. For example, Extensible Mark-Up Language (XML) could be used in the web page design which allows developers of web pages to define application specific tags. For web pages without tracking codes, the call spawning device 800 may generate such codes "on the fly" using standard techniques. A scheme of meaning extraction may be used to create keywords. For example, combinations of words may be used as flags to select keywords such as ornamental-exclusive may be associated with high price as a keyword.

Figure 19:
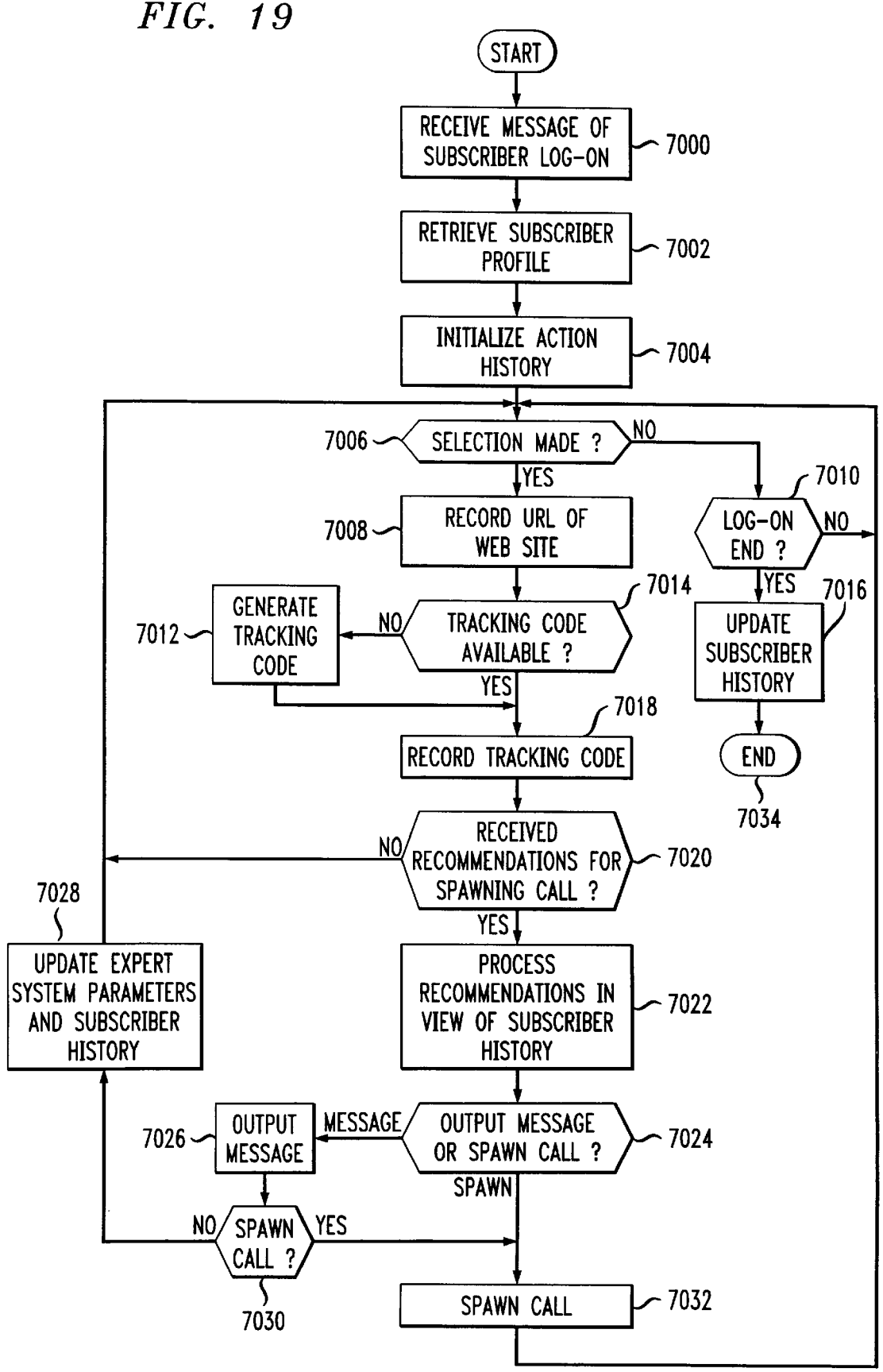
FIG. 19 shows a flowchart of a process of the call spawning device.

FIG. 19 shows a flowchart of a process of the call spawning device 800. In step 7000, the controller 802 receives a message indicating that the subscriber has logged on to the data network and goes to step 7002. In step 7002, the controller 802 retrieves subscriber profile information from the database 806 and other information related to the subscriber and goes to step 7004. In step 7004, the controller 802 initializes an action history file for the subscriber and goes to step 7006.

In step 7006, the controller 802 determines whether a selection has been made by the subscriber. If a selection was made, the controller 802 goes to step 7008; otherwise the controller 802 goes to step 7010. In step 7010, the controller 802 determines whether the subscriber has ended the log on. If ended, the controller 802 goes to step 7016; otherwise, the controller returns to step 7006. In step 7016, the controller 802 updates the subscriber's history file in the database 806 and goes to step 7034 to end the process.

In step 7008, the controller records the URL of the web site in which the subscriber made the selection and goes to step 7014. In step 7014, the controller 802 determines whether the selection contains tracking code. If the selection contains tracking code, the controller 802 goes to step 7018; otherwise, the controller 802 goes to step 7012. In step 7012, the controller 802 generates the tracking code by using various schemes such as identifying combinations of words to select standardized keywords and records other information such as a web page location within the web site as well as the selection within the web page and then goes to step 7018.

In step 7018, the controller 802 records the tracking code and goes to step 7020. In step 7020, the controller 802 determines whether recommendations for spawning a call have been received from the expert system 808. In implementations where the controller 802 performs the functions of the expert system 808, the controller 802 generates the recommendations in step 7020. If recommendations are received (or generated), the controller 802 goes to step 7022; otherwise the controller returns to step 7006. In step 7022, the controller processes the recommendations in view of subscriber history that was retrieved from the subscriber profile in step 7002 to select one of the recommendations and goes to step 7024.

In step 7024, the controller 802 determines whether to output a message to the subscriber or to automatically spawn a call. The controller 802 may make this determination based on past subscriber preferences and strength of the recommendations. The strength of a recommendation may be determined based on a probability that the recommendation is relevant multiplied by a probability that the subscriber desires to spawn a call, for example. Thus, if this product exceeds 0.8, for example, then a call may be spawned but a message is sent otherwise. If a message is to be outputted to the subscriber, the controller 802 goes to step 7026; otherwise the controller 802 goes to step 7032.

In step 7026, the controller 802 outputs the message and goes to step 7030. In step 7030, the controller 802 determines whether the subscriber elected to spawn a call. If call spawning is elected, the controller 802 goes to step 7032; otherwise, the controller goes to step 7028. In step 7028, the controller 802 updates the expert system's parameters in view of the subscriber's rejection of the prior recommendation as well as update the subscriber's history and returns to step 7006. In step 7032, the controller 802 spawns the call by initiating the call to the subscriber and bridging the call assistance device 400 with the subscriber in a voice communication. The controller 802 may also coordinate with the call coordination device 100 so that preamble information may be sent to the call assistance device 400 to prime the operator or assisting party prior to bridging the call. After step 7032, the controller 802 returns to step 7006.

As shown in FIGS. 9 and 15 the call coordination device 100 and the call spawning device 800 may preferably be implemented either on a general purpose computer. Also, a dedicated expert system processor may be included. However, other hardware/software implementations such as special purpose computer, programmed microprocessor microcontroller, and peripheral integrated circuit elements, and ASIC or other integrated circuit, a digital signal processor, a hard wired electronic or logic circuit such as a discrete circuit, a programmable logic such as a PLD, PLA, PGA, FPGA, PAL or the like are possible. In general, any device capable of implementing a finite state machine is in turn capable of implementing the flowcharts shown in FIGS. 11, 12 and 19 could be used to implement the data network call setup system.

Finally, all the connections that couple system components together can be any wired or wireless link capable of connecting the devices described herein. Furthermore, network 300 can be any of or a combination of a LAN, WAN, intranet, Internet, telecommunication, or specialty network.

While the invention has been described in conjunction with preferred embodiments thereof, it is evident that many alternatives, modifications, and variations be apparent to those skilled in the art.

For example, the call coordination device 100 and the call spawning device 800 may be implemented as separate units as shown in FIGS. 1 and 15 or as a single unit. Also, while the call coordination device 100 and the call spawning device 800 are shown and discussed as units separate from the user device 200 and 202, these devices 100 and 800 may be incorporated as part of the user devices 200 and 202. For example, programs may be created or an add-in card may be inserted to perform all the functions of the devices 100 and 800. Further, the devices 100 and 800 may be partially implemented in the user devices 200 and 202 and partially in an independent unit so that the portions in the user devices 200 and 202 may communicate with the independent unit to receive global information related to sales, deals, etc., for example, of subscribing businesses. Accordingly, all alternatives, modifications and variations which fall within the spirit and scope of this invention are included.

What is claimed is:

1. A method for initiating a call in a system, comprising:
generating an action history based on the plurality of actions; and
initiating the call based on the action history.

2. The method of claim 1, further comprising:
generating at least one potential call destination to a called party; and
selecting one of the at least one potential call destination for the call.

3. The method of claim 2, wherein the generating step comprises:
analyzing the action history to identify relevant subject matter to subscriber interest;
comparing the relevant subject matter with potential called parties that have a relationship with the relevant subject matter; and
selecting at least one of the potential called parties as the at least one potential call destination.

4. The method of claim 3, wherein the potential called parties are compiled in a list indexed by keywords, the analyzing step applying an expert system that evaluates the action history to generate a set of relevant keywords based on predetermined criteria, the relevant keywords being compared with indices of the list to generate the number of the potential called parties.

5. The method of claim 4, wherein the plurality of actions of the subscriber is performed in connection with a web page of the data network, if a selection of the web page includes at least one shadow tracking code, the generating the action history step retrieving shadow tracking codes and storing the shadow tracking codes as the action history.

6. The method of claim 5, wherein if the selection of the web page does not include a shadow tracking code, the generating the action history step generating the shadow tracking code by selecting keywords most related to subject matter of the selection.

7. The method of claim 6, wherein a tracking code comprises at least one of:
preamble information that includes a brief description of a subject matter of the selection;
identification of an information provider supporting the web page; and
identification of a potential call destination.

8. The method of claim 3, further comprising selecting one of the at least one potential called parties based on a subscriber profile.

9. The method of claim 8, wherein the subscriber profile includes at least one of:
a purchase history;
an income level; and
an interest history.

10. The method of claim 3, wherein the potential called party includes at least one of:
a merchant dealing in merchandise related to the relevant subject matter;
an author of information of the relevant subject matter; and
an expert of the relevant subject matter.

11. The method of claim 1, further comprising:
asking whether the subscriber desires the call to be initiated; and
initiating the call based on a response of the subscriber.

12. The method of claim 11, further comprising:
opening a window on a display of a device used by the subscriber for interfacing with the data network;
displaying in the window a query whether the call is to be initiated;
initiating the call if the subscriber responds affirmatively to the query; and
not initiating the call if the subscriber responds negatively or does not respond within a predetermined amount out time.

13. A call spawning device that initiates a call based on a plurality of actions of a subscriber on a data network, comprising:
a data network interface;
a controller coupled to the data network interface, the controller generating an action history based on the plurality of actions, and initiating a call based on the action history.

14. The device of claim 13, wherein the controller generates at least one potential call destination to a called party, and selects one of the at least one potential call destination for the call.

15. The device of claim 14, wherein the controller analyzes the action history to identify relevant subject matter to subscriber interest, compares the relevant subject matter with potential called parties that have a relationship with the relevant subject matter, and selects at least one of the potential called parties as the at least one potential call destination.

16. The device of claim 15, wherein the potential called parties are compiled in a list indexed by keywords, the controller applying an expert system that evaluates the action history to generate a set of relevant keywords based on predetermined criteria, the relevant keywords being compared with indices of the list to generate the number of the potential called parties.

17. The device of claim 16, wherein the plurality of actions of the subscriber is performed in connection with a web page of the data network, if a selection of the web page includes at least one shadow tracking code, the controller retrieving shadow tracking codes and storing the shadow tracking codes as the action history.

18. The device of claim 17, wherein if the selection of the web page does not include a shadow tracking code, the controller generating the shadow tracking code by selecting keywords most related to subject matter of the selection.

19. The device of claim 18, wherein a tracking code comprises at least one of:
    preamble information that includes a brief description of a subject matter of the selection;
    identification of an information provider supporting the web page; and
    identification of a potential call destination.

20. The device of claim 15, wherein the controller selects one of the at least one potential called parties based on a subscriber profile.

21. The device of claim 20, wherein the subscriber profile includes at least one of:
    a purchase history;
    an income level; and
    an interest history.

22. The device of claim 15, wherein the potential called party includes at least one of:
    a merchant dealing in merchandise related to the relevant subject matter;
    an author of information of the relevant subject matter; and
    an expert of the relevant subject matter.

23. The device of claim 13, wherein the controller asks whether the subscriber desires the call to be initiated, and initiates the call based on a response of the subscriber.

24. The device of claim 23, wherein the controller opens a window on a display of a device used by the subscriber for interfacing with the data network, displays in the window a query whether the call is to be initiated, initiates the call if the subscriber responds affirmatively to the query, and not initiate the call if the subscriber responds negatively or does not respond within a predetermined amount out time.

* * * * *